United States Patent
Coin

(10) Patent No.: US 10,571,878 B2
(45) Date of Patent: Feb. 25, 2020

(54) METHOD AND SYSTEM FOR CONTROLLING A MULTI-PUMP SYSTEM

(71) Applicant: Schneider Toshiba Inverter Europe SAS, Pacy sur Eure (FR)

(72) Inventor: Sylvain Coin, Bretagnolles (FR)

(73) Assignee: Schneider Toshiba Inverter Europe SAS, Pacy sur Eure (FR)

(*) Notice: Subject to any disclaimer, the term of this patent is extended or adjusted under 35 U.S.C. 154(b) by 168 days.

(21) Appl. No.: 15/785,473

(22) Filed: Oct. 17, 2017

(65) Prior Publication Data

US 2018/0129177 A1    May 10, 2018

(30) Foreign Application Priority Data

Nov. 8, 2016 (FR) ...................... 16 60760

(51) Int. Cl.
    *G05B 19/042*    (2006.01)

(52) U.S. Cl.
    CPC .... *G05B 19/042* (2013.01); *G05B 2219/2614* (2013.01)

(58) Field of Classification Search
    CPC ....... G05B 19/042; F04D 13/06; F04D 13/12; F04D 15/0066
    USPC ........................................................ 700/282
    See application file for complete search history.

(56) References Cited

U.S. PATENT DOCUMENTS

| | | | |
|---|---|---|---|
| 2009/0145234 A1* | 6/2009 | Gasbarro | A61H 9/0078 73/700 |
| 2014/0169984 A1 | 6/2014 | Coin | |
| 2015/0150746 A1* | 6/2015 | Yurko | A61H 1/008 601/150 |
| 2015/0300346 A1 | 10/2015 | Patel et al. | |

FOREIGN PATENT DOCUMENTS

| | | |
|---|---|---|
| EP | 0 735 273 A1 | 10/1996 |
| EP | 2 743 507 A1 | 6/2014 |
| WO | WO 2015/105832 A1 | 7/2015 |

OTHER PUBLICATIONS

French Preliminary Search Report dated Jul. 26, 2017 in French Application 16 60760 filed Nov. 8, 2016 (with English Translation of Categories of Cited Documents and Written Opinion).

* cited by examiner

*Primary Examiner* — Ziaul Karim
(74) *Attorney, Agent, or Firm* — Oblon, McClelland, Maier & Neustadt, L.L.P.

(57) ABSTRACT

A method and a system for controlling a multipump system used to pump a fluid. The system includes n pumping cells (Ci) connected in parallel, with n greater than or equal to 2. The system is controlled by using a reference pressure difference. The method includes estimating a pressure difference (dPpumpi) generated by each pumping cell (Ci) taking into account of a quadratic correction value (HEGi) representing the head losses of the pumping cell, estimating a pressure difference (dPSys) of the multipump system from the pressure difference estimated for each pumping cell, comparing the multipump estimated pressure difference (dPSys) with the reference pressure difference (dPsp) in order to control the reference speed (Wref) to be injected into a control loop of the multipump system.

14 Claims, 3 Drawing Sheets

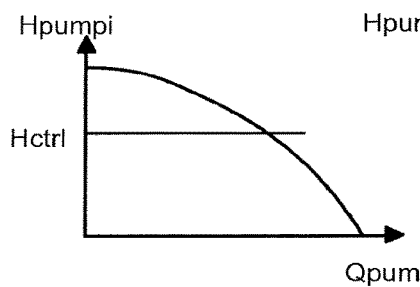
*Fig. 3A*
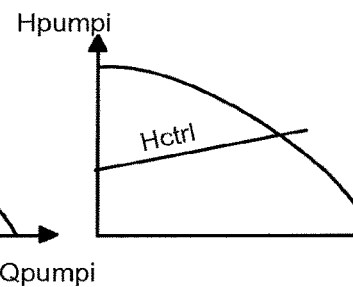
*Fig. 3B*
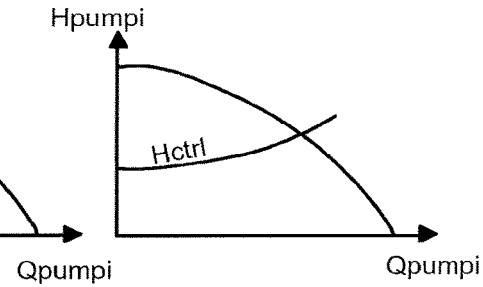
*Fig. 3C*
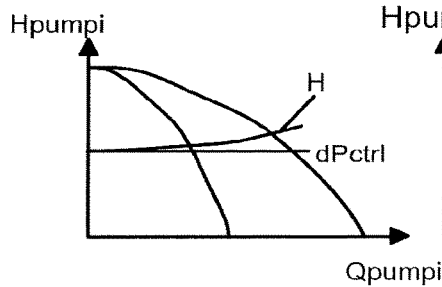
*Fig. 4A*
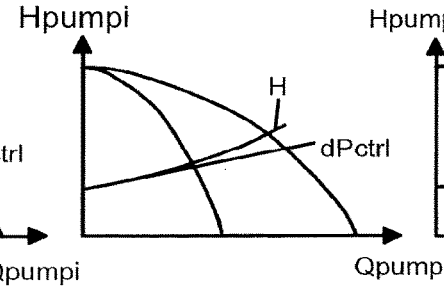
*Fig. 4B*
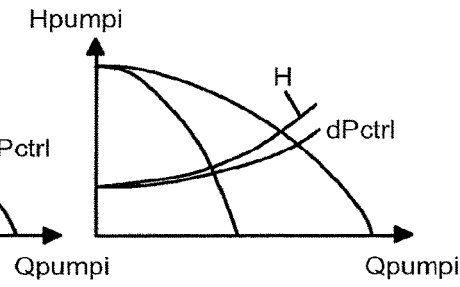
*Fig. 4C*
*Fig. 5*
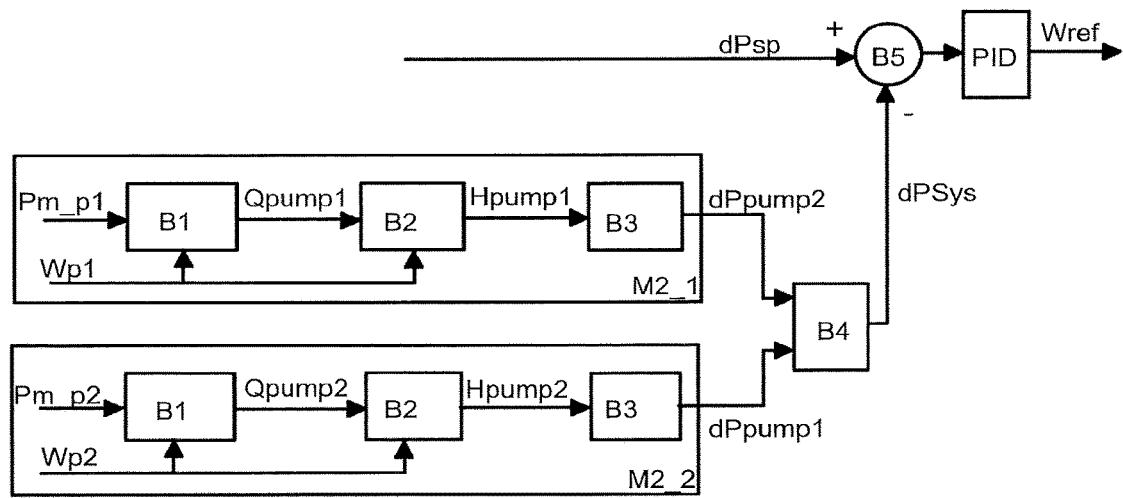

METHOD AND SYSTEM FOR CONTROLLING A MULTI-PUMP SYSTEM

TECHNICAL FIELD OF THE INVENTION

The present invention relates to a method and a system for controlling a multipump system.

PRIOR ART

A multipump system includes at least two pumps, each pump being controlled by a variable speed drive to deliver a particular flow rate or pressure. In the multipump system, the pumps are connected in parallel to the same inlet pipe and their outlets are joined in a common outlet pipe. For an overall reference, the pumps of the system are controlled independently. The speed required of each pump and the number of pumps activated are a function of the overall reference and possibly of various input parameters or constraints, such as electrical energy saving constraints, for example. Thus it is clear that, for the same overall reference, the number of pumps activated and the speed required of each pump can vary.

The patent applications EP0735273A1, WO2015/105832A1 and EP2743507A1 describe multipump system control solutions.

In some applications such as the control of heating/ventilating/air conditioning (HVAC) installations, it is advantageous to monitor the pressure difference between the inlet and the outlet of the multipump system employed as a function of the required flow rate. The simplest way to achieve this is to employ pressure and flow rate sensors.

However, for various reasons, notably of cost, maintenance, ease of installation, it is beneficial to dispense with pressure and flow rate sensors and to propose multipump system control solutions with no sensors (termed "sensorless" solutions).

As a general rule sensorless solutions are based on monitoring the head. However, in these sensorless solutions, even with a constant overall reference and pumps that are all identical, discontinuities occur in the flow rate. There are various reasons for these discontinuities:
- a first reason is linked to the variable number of pumps that the system can activate for the same reference. In other words, for the same reference the system could choose to activate more or fewer pumps, to activate some of them and to stop others of them during the pumping process.
- A second reason is linked to imbalances between the pumps of the system. Two identical pumps, with the same reference, do not necessarily produce the same outlet flow rate.

The object of the invention is therefore to propose a method of controlling a multipump system that can eliminate the disadvantages of the prior art by overcoming the problems of the imbalance between the pumps and the individual control strategy of the pumps of the system.

SUMMARY OF THE INVENTION

That object is achieved by a method for controlling a multipump system used to pump a fluid, said system including n pumping cells connected in parallel, with n greater than or equal to 2, and each comprising an inlet, an outlet and a pump connected between the inlet and the outlet, at least one inlet junction point connected to each inlet of the pumping cells and at least one outlet junction point connected to each outlet of the pumping cells, said system being controlled in accordance with a reference pressure difference between said inlet junction point and said outlet junction point, said method consisting in:
  Estimating a pressure difference between its inlet and its outlet generated by each pumping cell taking into account of a (for example quadratic) correction value representing the head losses in the pumping cell,
  Estimating a pressure difference of the multipump system from the pressure difference estimated for each pumping cell,
  Comparing said multipump system estimated pressure difference with said reference pressure difference in order to command a reference speed to be injected into a control loop of the multipump system.

According to one particular feature, the method includes, for each pumping cell, a step of determination of the estimated flow rate of the pump from an estimated mechanical power of the pump and a PQ type pump curve at an estimated speed of the pump.

According to another particular feature, the method includes, for each pumping cell, a step of determination of an estimated manometric head from the estimated flow rate and an HQ type pump curve at an estimated speed of the pump.

According to another particular feature, for each pumping cell, the estimated pressure difference of the pumping cell is determined from the estimated head and said correction value.

According to one particular embodiment, the method includes a step of correction of the reference pressure difference using a quadratic compensation coefficient.

According to a first embodiment, the method includes an initial learning step executed to determine the quadratic correction value representing the head losses in the pumping, said initial learning step consisting in:
  actuating each pump of the system individually at a particular reference individual flow rate,
  actuating pumps of the system at least two by two at a reference total flow rate identical to said reference individual flow rate,
  determining a head loss compensation coefficient for each pumping cell,
  determining the correction value from the head loss compensation coefficient.

According to a second embodiment, the quadratic correction value is determined theoretically from the head equivalent to the head losses of the pumping cell of the system at a given flow rate.

The invention also concerns a system for controlling a multipump system used to pump a fluid, said system including n pumping cells connected in parallel, with n greater than or equal to 2, and each comprising an inlet, an outlet and a pump connected between the inlet and the outlet, at least one inlet junction point connected to each inlet of the pumping cells and an outlet junction point connected to each outlet of the pumping cells, said system being controlled in accordance with a reference pressure difference between said inlet junction point and said outlet junction point, said system including:
  a module for determination of an estimated pressure difference between its inlet and its outlet generated by each pumping cell taking account of a correction value representing the head losses in the pumping cell,
  a module for determination of a pressure difference of the multipump system from the pressure difference estimated for each pumping cell, a module for comparing said estimated pressure difference of the multipump system to said reference pressure difference in order to command injection of a reference speed into a control loop of the multipump system.

According to one particular feature, the system includes, for each pumping cell, a block for estimating the estimated flow rate of the pump from an estimated mechanical power of the pump and a PQ type pump curve at an estimated speed of the pump.

According to another particular feature, the system includes, for each pumping cell, a block for estimating an estimated head from the estimated flow rate and an HQ type pump curve at an estimated speed of the pump.

According to another particular feature, for each pumping cell, the system includes a block for estimating the estimated pressure difference of the pumping cell from the estimated head and said correction value.

According to one particular embodiment, the system includes a block for correcting the reference pressure difference using a quadratic compensation coefficient.

According to a first embodiment, the system includes a learning module executed to determine the correction value, said learning module including:
- a module for controlling each pump of the system individually in accordance with a particular reference individual flow rate,
- a module for controlling the pumps of the system at least two by two in accordance with a reference total flow rate identical to said reference individual flow rate,
- a module for determining a head loss compensation coefficient for each pumping cell,
- a module for determining the correction value from the head loss compensation coefficient.

According to a second embodiment, the system includes a module for determining the correction value from the head equivalent to the head losses of the pumping cell of the system at a given flow rate.

BRIEF DESCRIPTION OF THE FIGURES

Other features and advantages will become apparent in the following detailed description with reference to the appended drawings in which:

FIGS. 3A to 3C show three head-flow rate type pump curves used to control a pump and illustrating a head control mode that is respectively of constant, proportional and quadratic type.

FIGS. 4A to 4C show three HQ type pump curves used to control a pump and illustrating both the control principle of the invention of the pressure difference type, respectively of the constant, proportional and quadratic type, and the resulting head curve profile.

FIG. 5 is a diagram showing the operation of the invention in a constant type control mode.

DETAILED DESCRIPTION OF AT LEAST ONE EMBODIMENT

The invention applies to a multipump system 1 used to pump a fluid and including a plurality of controlled pumps.

A multipump system of this kind is notably employed for pumping a fluid in heating/ventilation/air conditioning (HVAC) type installations or in water treatment installations, for example.

Figure 1:
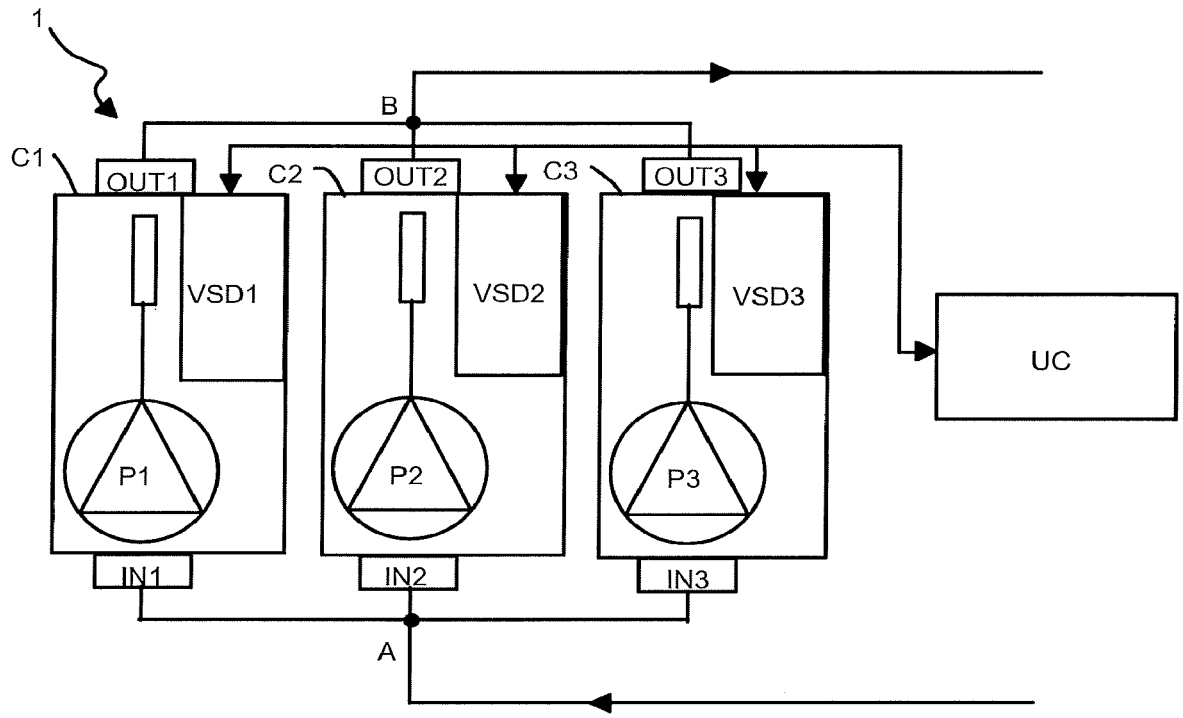
FIG. 1 is a diagram showing the architecture of a multipump system.

Referring to FIG. 1, a multipump system 1 includes n pumping cells Ci, with i ranging from 1 to n, and n greater than or equal to 2, each pumping cell Ci including an inlet INi, an outlet OUTi and a pump Pi positioned between the inlet and the outlet to pump a fluid from the inlet to the outlet. The n pumping cells Ci in the system 1 are connected in parallel, i.e. the system includes at least one inlet junction point A to which the inlets of all the pumping cells are connected and at least one outlet junction point B to which the outlets of all the pumping cells are connected. The multipump system 1 therefore includes n branches in parallel, each branch corresponding to a separate pumping cell.

In FIG. 1, a system 1 with three pumping cells C1, C2, C3 is shown. Of course, the invention can be applied to a system including at least two pumping cells.

Each pumping cell Ci further includes an electric motor, for example included in the pump, and controlled at variable speed by a variable speed drive VSDi, the variable speed drive advantageously forming part of the cell Ci. In known manner, a variable speed drive controls an electric motor by applying to it output voltage signals determined by a control loop receiving as input one or more reference values. The control loop is implemented by a control module executed by a control unit of the variable speed drive.

Figure 2:
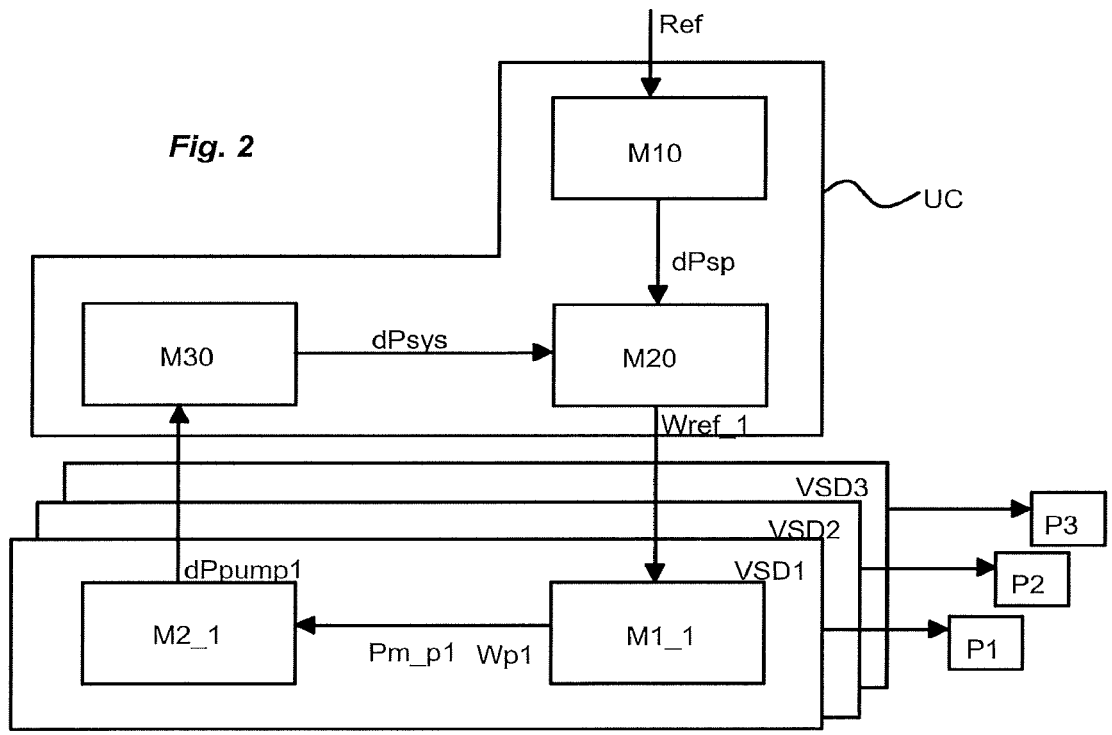
FIG. 2 shows the control architecture of a multipump system.

Referring to FIG. 2, the control architecture of an installation (for example of HVAC type) including a multipump system 1 of this type is for example as follows:

A control module M10 of the installation receives one or more input reference values Ref (for example a reference temperature) and determines a reference pressure difference dPsp.

The control module M20 of the multipump system 1 determines the control strategy to be applied to the pumping cells Ci of the system and sends a reference speed Wref_i to the control module M1_i of the pump of each pumping cell.

The pump Pi of each pumping cell Ci is controlled by its variable speed drive VSDi according to a control loop executed by the control module M1_i of the control unit of the variable speed drive. Each control module M1_i determines the output voltages to be applied to control the pump Pi of the cell Ci, notably as a function of an individual speed reference applied at the input.

A surveillance module M2_i of the control unit of the variable speed drive VSDi of each pumping cell Ci recovers operating data of the pump Pi from the control module M1_i, that data being notably the estimated mechanical power Pm_pi applied to the pump and the estimated speed Wpi applied to the pump Pi. This data is advantageously obtained without using speed sensors.

The surveillance module M2_i of each pumping cell Ci sends calculated data at regular intervals to a surveillance module of the multipump system 1, that data being notably the theoretical flow rate Qpumpi at the outlet of the cell, the estimated head Hpumpi to obtain that flow rate, and the estimated pressure difference dPpumpi between the inlet and the outlet of the cell.

The surveillance module M30 of the multipump system 1 sends the control module M20 of the multipump system an estimated pressure difference dPSys for the multipump system.

The control module M20 of the multipump system 1 determines the reference speed Wref_i to be applied to each pumping cell of the system as a function of the estimated pressure difference dPSys and the reference pressure difference dPsp received.

The control module M20 of the multipump system and the surveillance module M30 of the multipump system are for example executed in a central unit UC of a programmable automatic controller or in the control unit of one of the variable speed drives of the pumping cell of the system.

Likewise, the control module M10 of the installation is for example executed in a central unit UC of a programmable automatic controller, which can be identical to that described above, or in another control unit, such as one of the variable speed drives of a pumping cell of the system.

According to the invention, the control module M1_i and the surveillance module M2_i of the pumping cells and the control module M10 and the surveillance module M20 of the system 1 are included in a control system for implementing the control method of the invention.

In FIG. 2, there are shown in a nonlimiting manner the control module M10 of the installation, the control module M20 of the multipump system and the surveillance module M30 of the multipump system executed by the central unit of a programmable automatic controller, the latter being separate from the control unit associated with each variable speed drive VSDi of a pumping cell Ci.

As a general rule, a pump Pi is controlled by adjusting its head according to the required flow rate. To this end, the variable speed drive is based on pre-recorded pump curves. In a known manner, each pump is defined by a first pump characteristic curve. That curve illustrates the relationship between the head H of the pump and its volumetric flow rate Qpumpi at a given speed. The head Hpumpi of the pump is expressed in metres while the volumetric flow rate Qpumpi is expressed in m$^3$/hour, for example. Each pump is also defined by a second pump characteristic curve expressing the relationship between the mechanical power supplied to the pump and the flow rate Qpumpi at the outlet of the pump at a given speed.

To control a single pump, it is known to monitor the head of the pump directly using a predefined control curve Hctrl, which curve can be of constant (FIG. 3A), proportional (FIG. 3B) or quadratic form (FIG. 3C). Applying this type of control based on the head is not pertinent in the context of a multipump system.

The principle of the invention is therefore based on the application to the multipump system of a pressure difference control mode, which amounts to the virtual application of a correction to the head of the system. This solution makes it possible to take better account of the head losses present in each pumping cell in the system.

The operating principle employed for this control mode is described below with reference to FIGS. 5 and 6.

The surveillance module M2_i in each pumping cell Ci determines a theoretical pressure difference dPi of its pumping cell Ci. To this end the surveillance module M2_i effects the following operations:

It executes a block B1 for estimating the flow rate Qpumpi generated by the pump Pi from the mechanical power Pm_pi applied to the pump and the speed Wpi applied to the pump, this mechanical power and this speed preferably being estimated data obtained in the control loop of the pump. To this end it uses the PQ type pump curve defined above at the speed of the pump.

Using the estimated flow rate Qpumpi for the pump, it executes a block B2 for estimating the head Hpumpi to be applied to obtain that flow rate. To this end, it uses the HQ defined above at the speed of the pump.

It executes a block for estimating the pressure difference dPpumpi of the pumping cell Ci between the inlet and the outlet of the cell by applying a quadratic correction value HEGi to the head, that correction notably taking account of the head losses in its cell branch.

These three operations are executed in parallel by each surveillance module M2_i of the pumping cells Ci. The quadratic correction value HEGi applied is different for each pumping cell Ci. The principle used to determine the quadratic correction value HEGi to be applied for each pumping cell Ci is described below.

The surveillance module M30 of the multipump system 1 is then tasked with recovering the pressure difference value dPpumpi determined for each pumping cell Ci.

The surveillance module M30 of the system 1 executes a block B4 for determining a pressure difference for the multipump system as a whole. This estimated pressure difference of the system corresponds to the estimated pressure difference between the inlet junction point A and the outlet junction point B of the system. The estimation block B4 ideally applies the formula:

$$dP_{Sys} = dP_{pumpi}$$

In a variant embodiment, to take better account of certain particular features of the system, the estimation block B4 can also use the following expression:

$$dP_{Sys} = \sum_1^n (dP_{pump_i} \cdot Q_{pump_i}) \bigg/ \sum_1^n Q_{pump_i}$$

The surveillance module M30 of the system then injects the estimated pressure difference dPSys into the control module M20 of the system 1, the input of the control module M20 also receiving the reference pressure difference dPsp.

The control loop employed by the system differs depending on the control mode employed.

Referring to FIG. 5, for correction in the constant pressure difference control mode, the control module M20 operates as follows:

It executes a block B5 for comparing the estimated pressure difference dPSys for the system and the reference pressure difference dPsp, in order to determine the difference between the two.

It injects the difference determined into a proportional integral derivative (PID) action corrector so as to deduce therefrom the reference speed Wref of the system 1, so as to cause the pressure difference of the system to converge toward the reference pressure difference.

Figure 6:
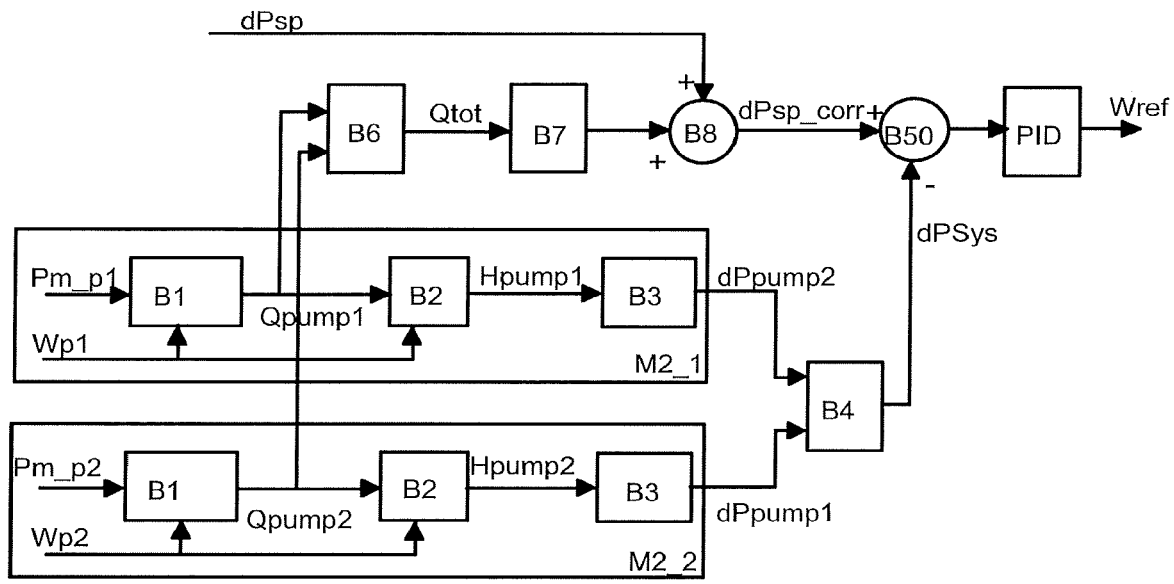
FIG. 6 is a diagram showing the operation of the invention in a quadratic type control mode.

Referring to FIG. 6, for correction in the quadratic pressure difference control mode, the control module M20 operates as follows:

It executes a module for correcting the reference pressure difference. This correction module employs a block B6 for estimating the total flow rate for the system 1 from the estimated flow rate Qpumpi obtained for each pumping cell Ci. The estimated total flow rate Qtot is injected into a correction block B7 applying a head loss compensation function (also known as a friction loss compensation (FLC) function) for the system. The correction value determined is added to the reference pressure difference dPsp to obtain a corrected reference pressure difference dPsp_corr (block B8).

It executes a block B50 for comparing the estimated pressure difference dPSys for the system and the corrected reference pressure difference dPsp_corr in order to determine the difference between the two.

It injects the difference determined into a proportional integral derivative (PID) action corrector so as to deduce therefrom the reference speed Wref of the system needed to cause the pressure difference of the system to converge toward the corrected reference pressure difference.

In the two solutions defined above, the speed control module M20 of the system is then tasked with determining the reference speeds to apply to each pumping cell Ci and to send them to the control modules of each pumping cell as a function of the overall reference speed Wref obtained.

Figure 7:
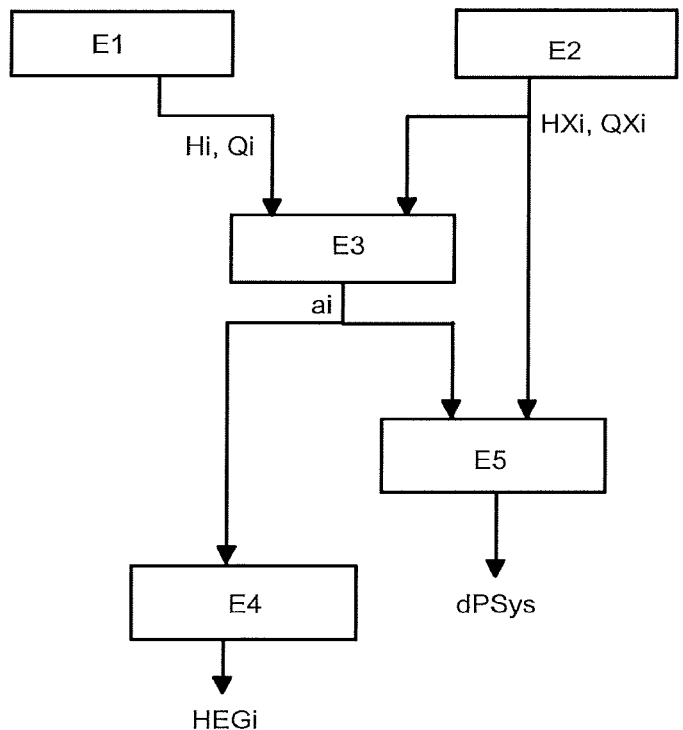
FIG. 7 is a diagram showing the principle of correction between head and pressure difference.

FIG. 7 illustrates the principle of determining the quadratic correction value HEGi to be applied in each pumping cell Ci. This quadratic correction value is determined differently for each pumping cell Ci. The determination method is for example executed outside normal operation of the system, for example during a learning step. It is for example executed at the level of a particular learning module associated with the multipump system and for example executed by the central unit of the programmable automatic controller defined above.

The principle explained below takes account of the fact that the system is stable and is not subject to load variations for a given flow rate. The losses in the pipes and in the load will be considered as always identical.

The first step E1 consists in executing a control module to actuate the pumps of the multipump system one after the other, each pump being controlled in accordance with the same reference flow rate.

For each pump actuated, the learning module recovers the flow rate and head data estimated by the surveillance module of each pumping cell.

Thus for this first step E1:

$H_i = H_{pumpi}$ $Q_i = Q_{pumpi} \approx Q_{ref}$ $H_i = dP_{Sys} + Hfl_i(Q_i^2)$ Where $Hfl_i(Q^2) = a_i \cdot Q^2$ (1)

Where:

Hi is the estimated head for each pumping cell Ci of the system;

Qi is the estimated flow rate generated by each pumping cell Ci of the system;

Qref is the reference flow rate required at the inlet of each pumping cell;

Hfli is the head equivalent to the head losses of the pumping cell Ci of the system;

dPsys is the pressure difference of the system;

$a_i$ is a head loss compensation coefficient (see below).

The second step E2 consists in executing a control module to actuate the pumps of the system two by two, with a total flow rate reference identical to the reference flow rate applied to each pump in the first step.

For each pump, the learning module recovers the flow rate and head data estimated by the surveillance module of each pumping cell.

Thus for this second step E2:

$HX_i = H_{pumpi}$ $QX_i = Q_{pumpi}$ where $\Sigma QX_i \approx Q_{ref}$ $HX_i = dP_{Sys} + Hfl_i(QX_i^2)$ where $Hfl_i(Q^2) = a_i \cdot Q^2$ (2)

Where:

HXi is the estimated head for each pumping cell Ci of the system in the second step;

QXi is the estimated flow rate generated by each pumping cell Ci of the system in this second step.

In a third step E3, the learning module determines the coefficient $a_i$ referred to above and representing the head losses in each pumping cell. To this end the learning module applies the following reasoning:

The expression for the coefficient $a_i$ is deduced from equations (1) and (2) above:

$$H_i - HX_i = Hfl_i(Q_i^2) - Hfl_i(QX_i^2) = Hfl_i(Q_i^2 - QX_i^2) \quad (3)$$

$$\text{i.e. } a_i = \frac{H_i - HX_i}{Q_i^2 - QX_i^2}$$

From the coefficient $a_i$ obtained following the third step E3, the learning module can then, in a fourth step E4, calculate the correction HEGi to be applied for each pumping cell Ci:

$$dP_{Pump} = H_{pump} + HEG \times H_{BEP} \cdot \frac{Q_{Pump}^2}{Q_{BEP}^2}$$

$$dP_{Pump} = H_{Pump} + a \cdot Q_{Pump}^2$$

where:

$$a = HEG \times \frac{H_{BEP}}{Q_{BEP}^2}$$

From equation (3):

$$a_i = HEG_i \times \frac{H_{BEP}}{Q_{BEP}^2} = \frac{H_i - HX_i}{Q_i^2 - QX_i^2}$$

$$\text{i.e. } HEG_i = \frac{H_i - HX_i}{H_{BEP}} \times \frac{Q_{BEP}^2}{Q_i^2 - QX_i^2}$$

Where $H_{BEP}$ and $Q_{BEP}$ respectively correspond to the head and to the flow rate of the system at the best efficiency point.

Then, in a fifth step E5, the learning module can determine the pressure difference of the system using the following reasoning:

From equations (2) and (3) above:

$$dP_{Sys} = \quad (4)$$

$$HX_i - Hfl_i(QX_i^2) = HX_i - a_i \times QX_i^2 = HX_i - \frac{H_i - HX_i}{Q_i^2 - QX_i^2} \times QX_i^2$$

$$\text{i.e. } dP_{Sys} = \frac{HX_i \cdot Q_i^2 - H_i \cdot QX_i^2}{Q_i^2 - QX_i^2}$$

In a variant embodiment it is equally possible for the learning module to determine the correction HEGi for each pumping cell in the following manner from the "theoretical"

head losses at a given flow rate, for example at the flow rate $Q_{BEP}$ corresponding to the flow rate at the best efficiency point:

$$P_{Pump} = H_{Pump} + HEG \times H_{BEP} \cdot \frac{Q_{Pump}^2}{Q_{BEP}^2}$$

And because $Hfl_i(Q_{BEP})$ corresponds to the head losses at the flow rate $Q_{BEP}$:

$$HEG_i = \frac{Hfl_i(Q_{BEP})}{H_{BEP}}$$

The invention therefore has numerous advantages. It enables centralized control without having to take account of the individual control of the pumps in the system. Control is therefore transparent whatever control strategy is adopted. Moreover, the solution of the invention makes possible control of the system in the pressure difference mode and taking account of the head losses in the various branches of the system.

FIGS. 4A to 4C show the correction applied using control in accordance with the pressure difference dPctrl and the resulting head.

The invention claimed is:

1. A method for controlling a multipump system used to pump a fluid, said system comprising n pumping cells (Ci) connected in parallel, with n greater than or equal to 2, and each comprising an inlet, an outlet, and a pump (Pi) connected between the inlet and the outlet, at least one inlet junction point (A) connected to each inlet of the pumping cells, and at least one outlet junction point (B) connected to each outlet of the pumping cells, said system being controlled in accordance with a reference pressure difference (dPsp) between said inlet junction point and said outlet junction point, the method comprising:
for each pumping cell (Ci), estimating a pressure difference (dPpumpi) between the inlet and the outlet generated by the pumping cell taking into account of a correction value (HEGi) representing any head losses in the pumping cell,
estimating a pressure difference (dPSys) of the multipump system from the pressure difference estimated for each pumping cell, and
comparing said multipump system estimated pressure difference (dPSys) with said reference pressure difference (dPsp) in order to command a reference speed (Wref_i) to be injected into a control loop of the multipump system to cause a pressure difference of the multipump system to converge toward the reference pressure difference (dPsp).

2. The method according to claim 1, wherein, for each said pumping cell (Ci), the method further comprises determining an estimated flow rate of the pump from an estimated mechanical power (Pm_pi) of the pump and a first pump characteristic curve at an estimated speed (Wpi) of the pump.

3. The method according to claim 2, wherein, for each pumping cell (Ci), the method further comprises determining an estimated head (Hpumpi) from the estimated flow rate and a second pump characteristic curve at an estimated speed of the pump.

4. The method according to claim 3, wherein, for each said pumping cell (Ci), the estimated pressure difference of the pumping cell is determined from the estimated head (Hpumpi) and said correction value (HEGi).

5. The method according to claim 1, wherein the method further comprises correcting the reference pressure difference (dPsp) using a quadratic compensation coefficient.

6. The method according to claim 1, wherein the method further comprises executing an initial learning step to determine the correction value (HEGi) representing any head losses in the pumping cell, said initial learning step comprising:
actuating each pump (Pi) of the system individually at a particular reference individual flow rate,
actuating pumps of the system at least two by two at a reference total flow rate identical to said reference individual flow rate,
determining a head loss compensation coefficient ($a_i$) for each pumping cell, and
determining the correction value from the head loss compensation coefficient ($a_i$).

7. The method according to claim 1, wherein the method further comprises determining the correction value (HEGi) from a head equivalent to any head losses of the pumping cell of the system at a given flow rate.

8. A system for controlling a multipump system used to pump a fluid, said system including n pumping cells (Ci) connected in parallel, with n greater than or equal to 2, and each comprising an inlet, an outlet and a pump (Pi) connected between the inlet and the outlet, at least one inlet junction point (A) connected to each inlet of the pumping cells and at least one outlet junction point (B) connected to each outlet of the pumping cells, said system being controlled in accordance with a reference pressure difference (dPsp) between said inlet junction point and said outlet junction point, wherein said system comprises:
for each pumping cell (Ci), a module for determination by estimation of an estimated pressure difference (dPpumpi) between the inlet and the outlet generated by the pumping cell taking account of a correction value (HEGi) representing any head losses in the pumping cell,
a module for determination of a pressure difference (dPSys) of the multipump system from the pressure difference estimated for each pumping cell, and
a module for comparing said estimated pressure difference (dPSys) of the multipump system to said reference pressure difference (dPsp) in order to command injection of a reference speed (Wref_i) pinto a control loop of the multipump system to cause a pressure difference of the multipump system to converge toward the reference pressure difference (dPsp).

9. The system according to claim 8, wherein, for each pumping cell (Ci), a block (B1) for estimating an estimated flow rate of the pump from an estimated mechanical power (Pm_pi) of the pump and a first pump characteristic curve at an estimated speed (Wpi) of the pump is provided by the system.

10. The system according to claim 9, wherein, for each pumping cell (Ci), a block (B2) for estimating an estimated head (Hpumpi) from the estimated flow rate and a second pump characteristic curve at an estimated speed of the pump is provided by the system.

11. The system according to claim 10, wherein, for each pumping cell (Ci), a block (B3) for estimating the estimated pressure difference of the pumping cell from the estimated head (Hpumpi) and said correction value (HEGi) is provided by the system.

12. The system according to claim 8, wherein a block (B7) for correcting the reference pressure difference (dPsp) using a quadratic compensation coefficient is provided by the system.

13. The system according to claim 8, further comprising a learning module executed to determine the correction value (HEGi), said learning module comprising:
- a module for controlling each pump (Pi) of the system individually in accordance with a particular reference individual flow rate,
- a module for controlling the pumps of the system at least two by two in accordance with a reference total flow rate identical to said reference individual flow rate,
- a module for determining a head loss compensation coefficient ($a_i$) for each pumping cell, and
- a module for determining the correction value from the head loss compensation coefficient ($a_i$).

14. The system according to claim 8, further comprising a module for determining the correction value (HEGi) from a head equivalent to any head losses of the pumping cell of the system at a given flow rate.

\* \* \* \* \*